(12) United States Patent
Circello et al.

(10) Patent No.: US 9,729,319 B2
(45) Date of Patent: Aug. 8, 2017

(54) KEY MANAGEMENT FOR ON-THE-FLY HARDWARE DECRYPTION WITHIN INTEGRATED CIRCUITS

(71) Applicants: Joseph C. Circello, Phoenix, AZ (US); David J. Schimke, Phoenix, AZ (US); Mohit Arora, Austin, TX (US); Lawrence L. Case, Austin, TX (US); Rodney D. Ziolkowski, Del Mar, CA (US)

(72) Inventors: Joseph C. Circello, Phoenix, AZ (US); David J. Schimke, Phoenix, AZ (US); Mohit Arora, Austin, TX (US); Lawrence L. Case, Austin, TX (US); Rodney D. Ziolkowski, Del Mar, CA (US)

(73) Assignee: NXP USA, Inc., Austin, TX (US)

( * ) Notice: Subject to any disclaimer, the term of this patent is extended or adjusted under 35 U.S.C. 154(b) by 211 days.

(21) Appl. No.: 14/570,611

(22) Filed: Dec. 15, 2014

(65) Prior Publication Data
US 2016/0173282 A1 Jun. 16, 2016

(51) Int. Cl.
*H04L 9/08* (2006.01)
*H04L 9/06* (2006.01)
*G06F 21/72* (2013.01)

(52) U.S. Cl.
CPC .......... *H04L 9/0894* (2013.01); *H04L 9/0822* (2013.01); *H04L 2209/12* (2013.01)

(58) Field of Classification Search
CPC ... H04L 9/0861; H04L 9/0894; H04L 9/0631; H04L 9/14; G06F 21/72
(Continued)

(56) References Cited

U.S. PATENT DOCUMENTS 5,381,480 A 1/1995 Butter et al.
7,505,598 B2 3/2009 Baer et al.
(Continued)

FOREIGN PATENT DOCUMENTS

EP 1679632 A2 7/2006
WO WO2009/029842 A1 3/2009

OTHER PUBLICATIONS

Office action mailed Dec. 22, 2015, Circello et al. "Decryption Systems and Related Methods for On-The-Fly Decryption Within Integrated Circuits", U.S. Appl. No. 14/570,706, filed Dec. 15, 2014, 12 pgs.
(Continued)

*Primary Examiner* — Shanto M Abedin

(57) ABSTRACT

Methods and systems are disclosed for key management for on-the-fly hardware decryption within an integrated circuit. Encrypted information is received from an external memory and stored in an input buffer within the integrated circuit. The encrypted information includes one or more encrypted key blobs. The encrypted key blobs include one or more secret keys for encrypted code associated with one or more encrypted software images stored within the external memory. A key-encryption key (KEK) code for the encrypted key blobs is received from an internal data storage medium within the integrated circuit, and the KEK code is used to generate one or more key-encryption keys (KEKs). A decryption system then decrypts the encrypted key blobs using the KEKs to obtain the secret keys, and the decryption system decrypts the encrypted code using the secret keys. The resulting decrypted software code is then available for further processing.

15 Claims, 6 Drawing Sheets

(58) Field of Classification Search
USPC .................................................. 380/44, 277
See application file for complete search history.

(56) References Cited

U.S. PATENT DOCUMENTS

| | | | |
|---|---|---|---|
| 7,702,100 | B2 | 4/2010 | Han et al. |
| 8,051,300 | B2 | 11/2011 | Cherian et al. |
| 8,175,276 | B2 | 5/2012 | Tkacik et al. |
| 8,423,789 | B1* | 4/2013 | Poo .................... G06F 21/602 |
| | | | 380/44 |
| 9,418,246 | B2 | 8/2016 | Circello et al. |
| 2001/0018736 | A1* | 8/2001 | Hashimoto ............ G06F 21/10 |
| | | | 713/1 |
| 2004/0005061 | A1* | 1/2004 | Buer .................... G06F 21/602 |
| | | | 380/282 |
| 2004/0015707 | A1* | 1/2004 | Lee ........................ G06F 21/85 |
| | | | 713/189 |
| 2005/0069131 | A1* | 3/2005 | de Jong ................ G06F 21/14 |
| | | | 380/239 |
| 2005/0190919 | A1 | 9/2005 | Baer et al. |
| 2006/0026417 | A1 | 2/2006 | Furusawa et al. |
| 2009/0060197 | A1 | 3/2009 | Taylor et al. |
| 2009/0150631 | A1 | 6/2009 | Wilsey |
| 2009/0259855 | A1 | 10/2009 | De Cesare et al. |
| 2009/0327746 | A1* | 12/2009 | Greco .................... G06F 21/602 |
| | | | 380/277 |
| 2010/0296651 | A1* | 11/2010 | Tkacik .................... G09C 1/00 |
| | | | 380/44 |
| 2011/0158403 | A1* | 6/2011 | Mathew ................ H04L 9/0631 |
| | | | 380/44 |
| 2013/0129086 | A1 | 5/2013 | Tang |
| 2014/0010371 | A1* | 1/2014 | Khazan ................ G06F 21/602 |
| | | | 380/278 |

OTHER PUBLICATIONS

Schaad et al., "Advanced Encryption Standard (AES) Key Wrap Algorithm", Sep. 2002, 39 pgs.
Premier Ministre, "Protection Profile-On-The-Fly Mass Storage Encryption Application", Aug. 2008, 43 pgs.
Wikipedia, "Multidimensional Parity-Check Code", Dec. 2012, 2 pgs.
Federal Information, Processing Standards Publication 197, Advanced Encryption Standard (AES), Nov. 26, 2001, 47 pgs.
Dworkin, "Recommendation for Block Cipher Modes of Operation", NIST Special Publication 800-38A, 2001, 59 pgs.
Circello et al. "Decryption Systems and Related Methods for On-The-Fly Decryption Within Integrated Circuits", U.S. Appl. No. 14/570,706, filed Dec. 15, 2014, 27 pgs.
Response filed Mar. 22, 2016, for Circello et al. "Decryption Systems and Related Methods for On-The-Fly Decryption Within Integrated Circuits", U.S. Appl. No. 14/570,706, filed Dec. 15, 2014, 12 pgs.
Notice of Allowance dated Apr. 25, 2016, for Circello et al. "Decryption Systems and Related Methods for On-The-Fly Decryption Within Integrated Circuits", U.S. Appl. No. 14/570,706, filed Dec. 15, 2014, 12 pgs.

* cited by examiner

KEY MANAGEMENT FOR ON-THE-FLY HARDWARE DECRYPTION WITHIN INTEGRATED CIRCUITS

RELATED APPLICATIONS

This application is related in subject matter to the following concurrently filed application: U.S. patent application Ser. No. 14/570,706, entitled "DECRYPTION SYSTEMS AND RELATED METHODS FOR ON-THE-FLY DECRYPTION WITHIN INTEGRATED CIRCUITS," which is each hereby incorporated by reference in its entirety.

TECHNICAL FIELD

This technical field relates to decryption of software images and, more particularly, the management of secret keys for decryption within an integrated circuit.

BACKGROUND

Customers using processing systems embedded within integrated circuits often desire to protect the application software code that is loaded and executed by these processing systems. As such, certain embedded processor systems use software or hardware decryption and a secret key to decrypt software images that are encrypted and stored in external memory systems. For these security applications, a cryptographic algorithm according to the Advanced Encryption Standard (AES) can be used to encrypt the software image, and AES decryption can then be used within the integrated circuit to decrypt the encrypted software image. AES encryption/decryption is well known and is commonly applied to provide secured protection of software code and/or other data blocks in various environments. The AES algorithm operates on 128-bit (16 byte) data blocks with either 128-bit, 192-bit, or 256-bit secret keys. Further, the AES algorithm uses a variable number of calculation rounds for the cryptographic calculation depending upon the size of the secret key being used. For example, where a 128-bit secret key is used for AES encryption, the data is processed through a series of calculations requiring ten (10) rounds to complete. Each round performs four different data transformations: (1) byte substitution using a substitution table, (2) shifting rows of a state array by different offsets, (3) mixing the data within each column of the state array, and (4) adding a round key to the state. The AES decryption function reverses these calculations using the same 128-bit secret key.

For secure applications with certain external memories, such as Quad-SPI (quad-serial-peripheral-interface) non-volatile flash memories, execute-in-place operational modes can cause difficulties with existing integrated circuit processing systems. For example, a decryption engine for such an execute-in-place operational mode may require that encrypted code be decrypted in real-time thereby allowing direct execution from the external memory system. However, a significant challenge for such real-time execution is protection of the secret keys, such as AES keys, that are being used to generate the encrypted code and to decrypt the encrypted code within the integrated circuit. One solution is to store the secret keys in external memories; however, such a solution has serious security implications as the secret keys can be accessed using rather straightforward techniques, such as through decapsulation and micro-probe of the external memory and/or through bus snooping during the external access to the secret keys in the external memories. As such, this prior solution is not effective in providing a high level of security for the encrypted software code.

DESCRIPTION OF THE DRAWINGS

It is noted that the appended figures illustrate only example embodiments and are, therefore, not to be considered as limiting the scope of the present invention. Elements in the figures are illustrated for simplicity and clarity and have not necessarily been drawn to scale.

DETAILED DESCRIPTION

Figure 1:
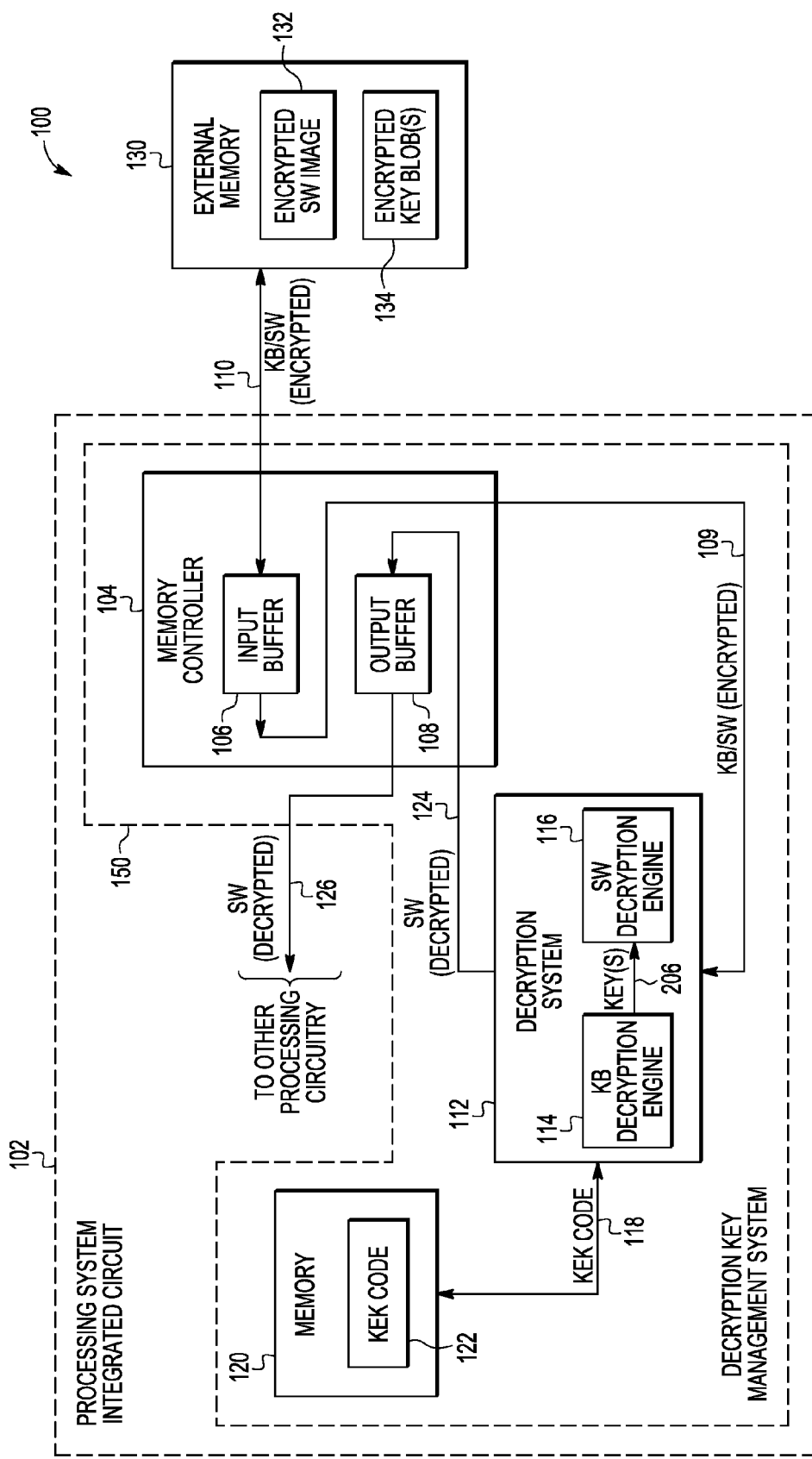
FIG. 1 is a block diagram of an example embodiment including a processing system integrated circuit that includes a decryption key management system.

Methods and systems are disclosed for key management for on-the-fly hardware decryption within an integrated circuit. Encrypted information is received from an external memory and stored in an input buffer within the integrated circuit. The encrypted information includes one or more encrypted key blobs. The encrypted key blobs include one or more secret keys for the encrypted code associated with one or more encrypted software images stored within the external memory. A key-encryption key (KEK) code for the encrypted key blobs is received from an internal data storage medium within the integrated circuit, and the KEK code is used to generate one or more key-encryption keys (KEKs). A decryption system then decrypts the encrypted key blobs using the KEKs to obtain the secret keys. Other information related to the encrypted code stored within the encrypted key blob can also be obtained. The decryption system decrypts the encrypted code using the secret keys. The resulting decrypted software code is then available for further processing. The decryption key management systems thereby operate such the KEK code, KEKs, and secret keys are accessible only to decryption hardware within the integrated circuit and are inaccessible to any software-accessible mechanism. Different features and variations can be implemented, as desired, and related or modified systems and methods can be utilized, as well.

As described herein, the disclosed key management embodiments encrypt secret keys for encrypted software images within encrypted key blobs prior to the encrypted information being stored in external memories. A blob (Binary Large OBject) is a collection of binary data stored as a single entity in a data storage system, and the key blobs include one or more keys that are used to encrypt other information such as software images. As described herein, the key blobs are themselves encrypted using separate key-encryption keys (KEKs) and then stored as encrypted key blobs in external memory. The KEKs for the encrypted key blobs and/or KEK codes from which the KEKs can be generated are stored in an internal memory within the integrated circuit. As such, the key management embodiments described herein provide for security with respect to the encrypted software images and their respective secret keys, and the key management embodiments are also platform independent such that the key management embodiments do not depend upon decryption systems that are external to the integrated circuit. Further, hardware-based KEK codes, which can be scrambled to generate the KEK keys for the encrypted key blobs, can be used to help to avoid software-based attacks that attempt to obtain secret keys for the encrypted software images. In addition, the disclosed embodiments can use standard AES encryption/decryption algorithms to cryptographically protect the secret keys for the encrypted software images and/or for the encrypted key blobs. For example, the AES Key Wrap/Unwrap Algorithm standard, as set forth by the RFC 3394 standard issued by the Internet Engineering Task Force (IETF), can be used to encrypt and decrypt the key blobs. Other standard AES algorithms can also be used encrypt and decrypt the software images. As such, a variety of existing generic tools, such as OpenSSL (open secure socket layer) tools, can be used to generate encrypted key blobs and/or encrypted software images, thereby simplifying implementations that take advantage of the key management embodiments described herein. Other variations can also be implemented as desired.

FIG. 1 is a block diagram of an example embodiment 100 including a processing system integrated circuit 102 that includes a decryption key management system 150. The decryption key management system 150 includes an internal memory 120, a decryption system 112, and a memory controller 104. External memory 130 includes an encrypted software (SW) image 132 and one or more encrypted key blob(s) 134. As described further below, each encrypted key blob includes a secret key that is used to encrypt the software image 132, and multiple key blobs, software images, and associated secret keys can also be used. The internal memory 120 stores a key-encryption key (KEK) code 122. The decryption system 112 includes a key blob (KB) decryption engine 114 and a software (SW) decryption engine 116, although a single decryption engine could also be used to implement both the key blob and software decryption. The memory controller 104 includes an input buffer 106 and an output buffer 108. The memory controller 104 is also connected to the external memory 130.

In operation, the encrypted key blob(s) 134 and an encrypted code data block from the encrypted software image 132 are fetched from the external memory system 130 through communications 110 and then received and stored by the input buffer 106. The decryption system 112 then receives the encrypted key blob(s) 134 from the input buffer 106 through communications 109 and receives the KEK code 122 from the internal memory 120 through communications 118. The key blob (KB) decryption engine 114 uses the KEK code 122 to decrypt the key blob(s) 134 in order to obtain the secret key(s) 206 and other information stored within the encrypted key blob(s) 134. The decryption system 112 then receives the encrypted software (SW) code data block from the input buffer 106 through communication 109. The software (SW) decryption engine 116 then uses the one or more secret key(s) 206 to decrypt the encrypted software code data block. The decrypted software code data block is then received and stored by the output buffer 108 through communications 124. The output buffer 108 makes the decrypted software code data block available to other processing circuitry within the system integrated circuit 102 through communications 126. The decrypted blocks of data from the decryption system 112 can also be output directly to other processing circuitry without first passing through the output buffer 108. It is noted that the encrypted software code data blocks can be accessed from the encrypted software image 132 stored in external memory 130 based upon one or more memory addresses that reference N-bit blocks of data, and N is multiples of 128 bits if an AES algorithm is the implemented cryptographic algorithm. Other variations could also be implemented.

It is again noted that a common decryption engine, such as an AES decryption engine, can be used for the key blob decryption engine 114 and the software decryption engine 116. It is further noted that the KEK code 122 can be a 128-bit code, that the secret key can be a 128-bit secret key, and that the N-bit blocks of data can be 128-bit blocks of data. Other code lengths, key lengths, and/or block lengths can also be used. Further, as described in more detail below, the KEK code 122 can match an encryption key for the encrypted key blob(s) 134, can be scrambled to obtain one or more encryption keys for the encrypted key blob(s) 134, or can be configured using some other technique. It is further noted that the internal memory 120 can be implemented as a programmable memory such as a one-time-programmable (OTP) memory. Further, programmable fuses or other write-once memory systems can be used for the OTP memory. Other internal memories could also be used to store the KEK code 122 such as non-volatile memories that store the KEK code 122 in predetermined memory locations. It is also note that the external memory system 130 can be implemented as a Quad-SPI flash memory; the input buffer 106 can be implemented as a Quad-SPI memory buffer; and the output buffer 108 can be implemented as a Quad-SPI receive (RX) buffer. Other memory systems could also be used.

Figure 2A:
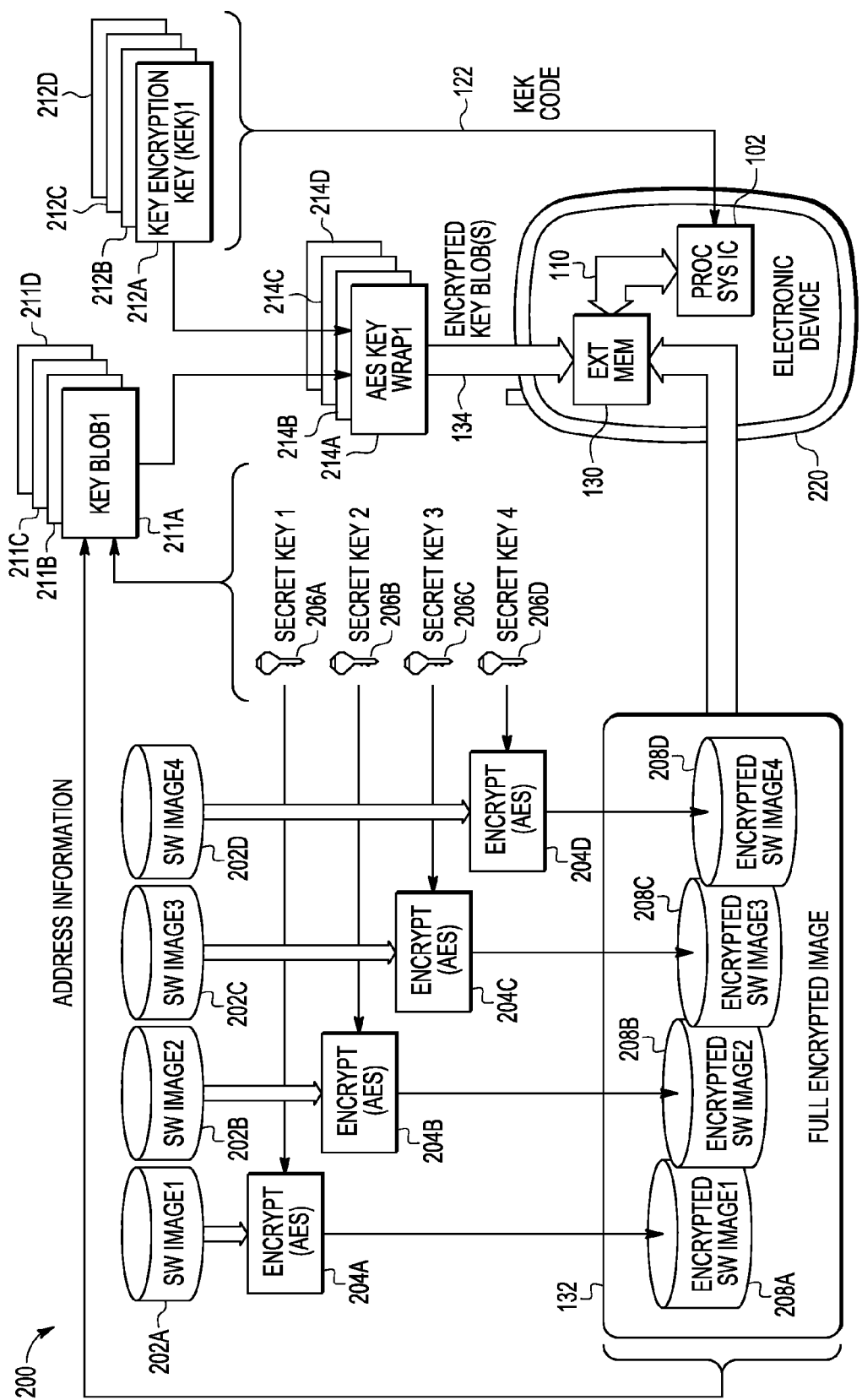
FIG. 2A is a block diagram of an example embodiment for an electronic device that includes a processing system integrated circuit and an external memory that stores one or more encrypted software images and associated encrypted key blobs (Binary Large OBjects).

FIG. 2A is a block diagram of an example embodiment 200 for an electronic device 220 that includes a processing system integrated circuit 102 and an external memory 130. For embodiment 200, multiple unencrypted software images 202A-D are used to form a complete or full encrypted software image 132 that is stored in the external memory 130. Further, multiple key blobs 211A-D are also encrypted and stored in the external memory 130. As described herein, the processing system integrated circuit 102 obtains and processes the encrypted key blob(s) 134 and the full encrypted software image 132 from the external memory 130 to provide on-the-fly decryption within the processing system integrated circuit 102.

For the example embodiment 200, the full encrypted software image 132 is formed from four separate encrypted software images 208A, 208B, 208C, and 208D. A first software image 202A is encrypted by encryption engine 204A using a first secret key 206A to form a first encrypted software image 208A. A second software image 202B is encrypted by encryption engine 204B using a second secret key 206B to form a second encrypted software image 208B. A third software image 202C is encrypted by encryption engine 204C using a third secret key 206C to form a third encrypted software image 208C. A fourth software image 202D is encrypted by encryption engine 204D using a fourth secret key 206D to form a fourth encrypted software image 208D. The resulting full encrypted software image 132 is stored in the external memory 130 within the electronic device 220.

The encrypted key blob(s) 134 are formed by encrypting multiple different key blobs 211A, 211B, 211C, and 211D with each key blob 211A-D including one of the secret keys 206A-D. In particular, a first key blob 211A includes the first secret key 206A and is encrypted by key wrap engine 214A using a first key-encryption key (KEK) 212A. A second key blob 211B includes the second secret key 206B and is encrypted by key wrap engine 214B using a second key-encryption key (KEK) 212B. A third key blob 211C includes the third secret key 206C and is encrypted by key wrap engine 214C using a third key-encryption key (KEK) 212C. A fourth key blob 211D includes the fourth secret key 206D and is encrypted by key wrap engine 214D using a fourth key-encryption key (KEK) 212D. The resulting group of encrypted key blobs make up the encrypted key blob(s) 134 that are stored in the external memory 130 within the electronic device 220. As described herein, a KEK code 122 from which the KEKs 212A-D can be obtained is stored within an internal memory 120 within the processing integrated circuit 102. As described further below, in addition to including one of the secret keys 206A-D, the key blobs 211A-D can also include other information such as address information related to the different encrypted software images 208A-D.

It is noted that the software images 208A-D can be from one or more different sources and can be encrypted using one or more different secret keys 206A-D. As such, different entities can provide different portions of the software images 202A-D that are included within the full encrypted image 132 and can separately protect those software images from discovery by applying a unique secret key for encryption of each individual software image 202A-D. For example, software image 202A may be provided by a first vendor and encrypted using a first secret key 206A. Software images 202B and 202C may be provided by a second vendor and encrypted using the same key for the second and third secret keys 206B and 206C. Software image 202D may be provided by a third vendor and encrypted using a further secret key 206D. The secret keys 206A-D are then included within the key blobs 211A-D and encrypted using the KEKs 212A-212D. It is noted that although the example embodiments described herein have primarily used four (4) software images and related key blobs, any number of software images and related key blobs can be used, and a single software image and key blob can also be used. Other variations can also be implemented.

Figure 2B:
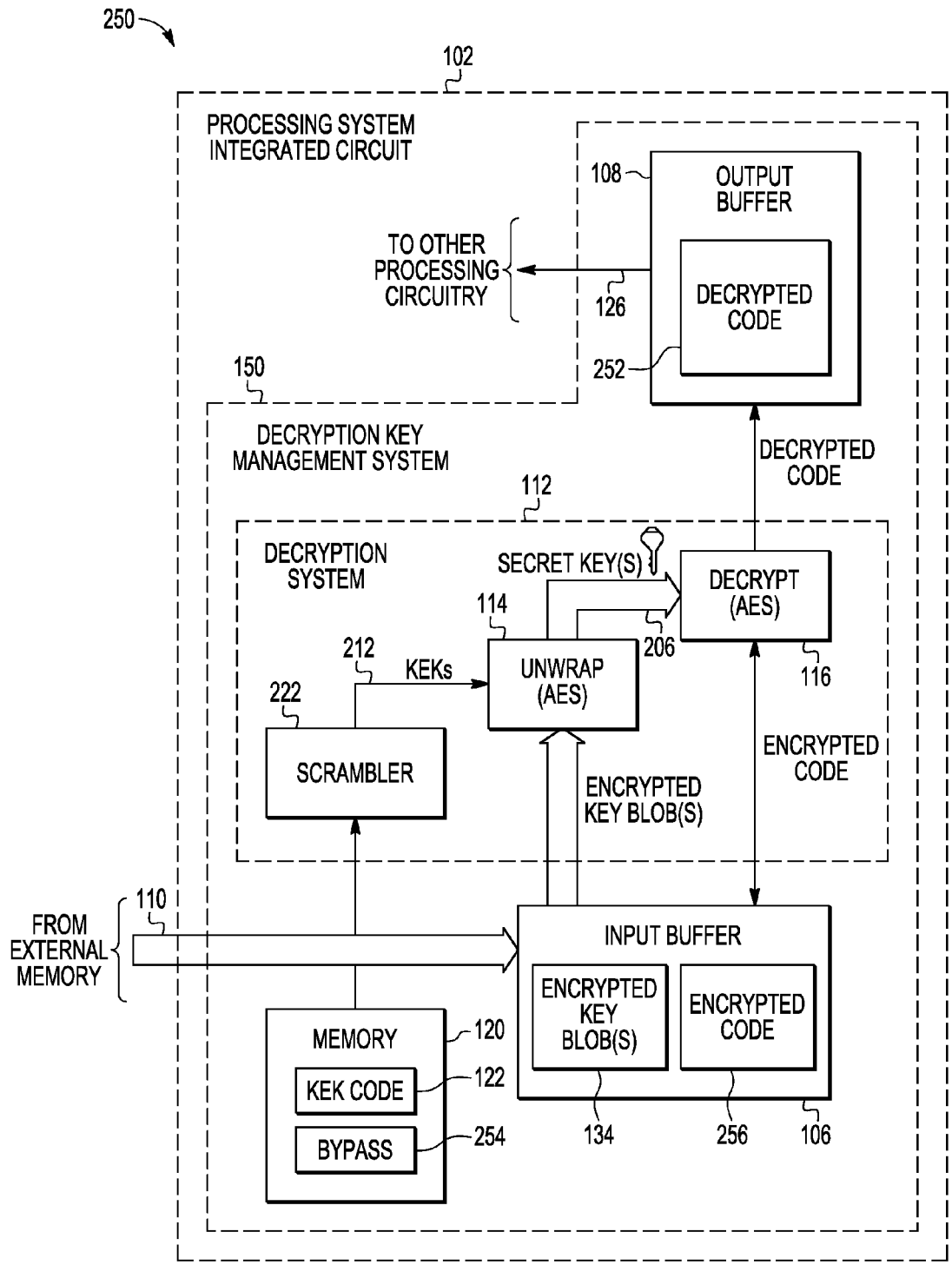
FIG. 2B is a block diagram of an embodiment including a decryption key management system that processes the encrypted software image(s) and associated encrypted key blob(s) stored within the external memory shown in the embodiment of FIG. 2A.

FIG. 2B is a block diagram of an embodiment 250 including a decryption key management system 150 that processes the encrypted key blob(s) 134 and encrypted software (SW) code 256 associated with the full encrypted software image 132 stored in external memory 130, as shown FIG. 2A. The input buffer 106 stores the encrypted key blob(s) 134 and the encrypted software (SW) code 256 accessed from the external memory 130 through communications 110. The KEK code 122 is stored in internal memory 120. For embodiment 250, the KEK code 122 is scrambled by scrambler 222 to generate the KEKs 212 that are used to decrypt the encrypted key blob(s) 134, although the scrambler 222 can also be bypassed to directly provide the KEKs 212 from the KEK code 122. Thus, if not bypassed, the scrambler 222 receives the KEK code 122 and generates the different KEKs 212 that are provided to key blob unwrap engine 114. The key blob unwrap engine 114 receives the encrypted key blob(s) 134 and decrypts them using the KEKs 212 to obtain the secret key(s) 206 that are provided to the software decryption engine 116. The software decryption engine 116 decrypts the encrypted code 256 using the secret key(s) 206 to generate the decrypted code 252 that is stored in output buffer 108. As described above, the decrypted code 252 can then be made available to other processing circuitry within the processing system integrated circuit 102 through communications 126. As further described above, the decrypted code 252 can also be provided directly to other processing circuitry without first being stored within the output buffer 108.

The scrambler 222, when included and enabled, provides an additional layer of security to protect the KEKs 212 being used to decrypt the encrypted key blob(s) 134. For example, the scrambler 222 can be configured to scramble the KEK code 122 using a user-defined mask or other parameters that were initially used to generate the KEKs 212. This scrambling of the KEK code 122 effectively increases the difficulty for an attacker to obtain the KEKs 212 used to encrypt the key blobs 211A-D. Thus, the KEK code 122 that is stored within the memory 120, such as within fuses that form an OTP memory, can be a predetermined value that must be scrambled or otherwise processed to generate the KEKs 212 thereby improving security. As one example, a scrambling function can be embedded within the scrambler 222 that uses programmable input parameters to scramble the KEK code 122, and this scrambling function can be provided to and used by users to generate the individual KEKs 212A-D used to encrypt the individual key blobs 211A-D in FIG. 2A. As such, the scrambling function and any associated input parameters used by the users to generate the KEKs 212A-D from the KEK code 122 are non-visible to a software attack on the processing system integrated circuit 102, the external memory 130, and/or related communication interfaces 110. Only the original users know the scrambling function and the input parameters used to generate the KEKs 212A-D from the KEK code 122 that is stored within the internal memory 120, and the scrambling function and input parameters can be used to configure and implement the scrambler 222 within the processing system integrated circuit 102. Although embodiment 250 includes one KEK code 122 that is used to generate multiple KEKs 212 through scrambler 222, it is also noted that multiple KEK codes could also be used. As such, it is understood that one KEK code 122 can be used to generate one or more KEKs 212 through scrambler 222, and one or more KEK codes can be stored within the internal memory 120.

It is further noted, as described above, that a bypass indicator 254, such as a bypass indication bit, can be used to bypass the scrambling operation within the scrambler 222, for example, where the KEKs 212 are desired to be stored directly within the internal memory 120. For such embodiments, the one or more KEK codes 122 within the internal memory 120 are configured to match the KEKs 212 and are passed directly to the key blob decryption (UNWRAP) engine 114. As such, bypass indicator 254 is asserted, and the KEK code scrambler 222 is bypassed. It is further noted that the KEK code scrambler 222 can be removed from the processing system integrated circuit 102, if desired, so that the KEKs 212 are always stored directly in the memory 120 as one or more matching KEK codes 122. Other variations could also be implemented.

Advantageously, for the decryption system embodiments described herein, the KEK code 122, secret key(s) 206, and the KEKs 212 can only be accessed through the internal hardware within the integrated circuit 102 and are inaccessible to any software-accessible mechanism. As such, there is no internal or external access to the KEK code 122, the KEKs 212, or the secret key(s) 206 by any software-accessible mechanism. This software inaccessibility provides a high level of security for the decryption system embodiments described herein as all of the security keys including the KEK code 122, the KEKs 212, and security key(s) 206 extracted from the decrypted key blob(s) 134 are wholly contained with the decryption key management system 150 and are unavailable to any software such that all of these security keys cannot be accessed in by software commands, firmware commands, and/or other software-accessible mechanisms.

Figure 3:
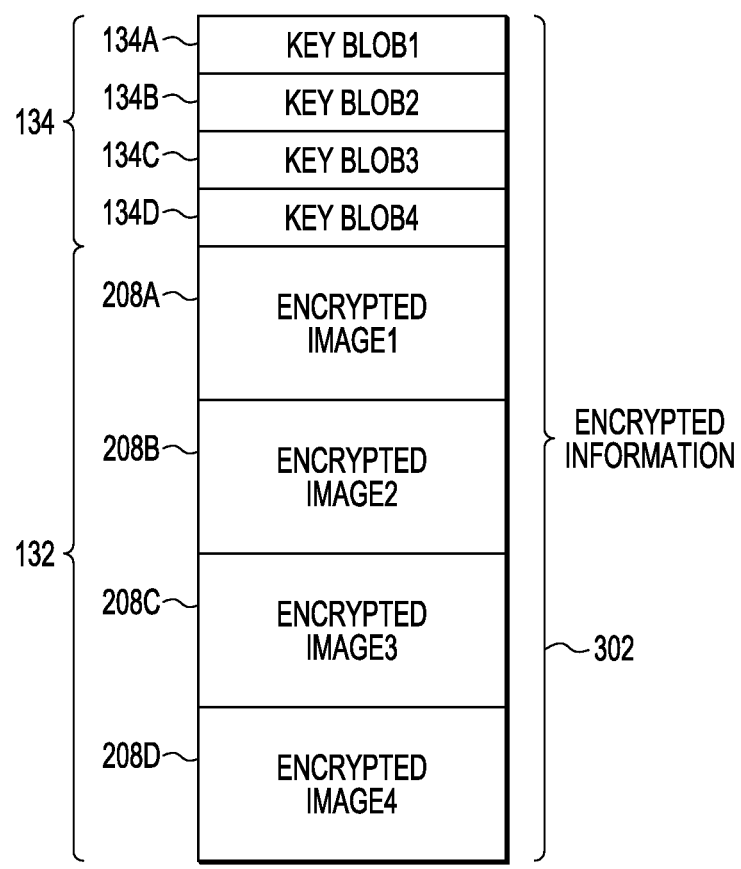
FIG. 3 is a diagram of an example embodiment for encrypted information that includes one or more key encrypted blobs and one or more encrypted software images.

FIG. 3 is a diagram of an example embodiment for encrypted information 302 that includes encrypted key blob(s) 134 as one or more individual encrypted key blobs 134A-D and that also includes one or more encrypted software images 208A-D that form the full encrypted software image 132. For the example embodiment depicted, the encrypted information 302 is a data block that includes the encrypted key blobs 134A-D appended in front of the encrypted software images 208A-D. It is noted that the encrypted key blobs 134A-D and the encrypted software images 208A-D could also be organized within one or more data blocks using different techniques. For example, the encrypted key blobs 134A-D could be appended behind the encrypted software images 208A-D, or the encrypted key blobs 134A-D and the encrypted software images 208A-D could be intermixed within a data block. Other variations could also be used while still taking advantage of the key management techniques described herein.

As described above, the encrypted key blobs 134A-D can be decrypted or unwrapped using an inverse of the encryption algorithm used to encrypt the original key blobs 211A-D. For example, an AES unwrap algorithm can be used for decryption (UNWRAP) engine 114 in FIG. 2B that is associated with an AES wrap algorithm used for the encryption engines 214A-D in FIG. 2A, and wrap/unwrap algorithms can both be based upon the AES Key Wrap/Unwrap Algorithm standard as set forth by the Internet Engineering Task Force (IETF) in the RFC 3394 standard. Other encryption/decryption techniques could also be used.

Figure 4:
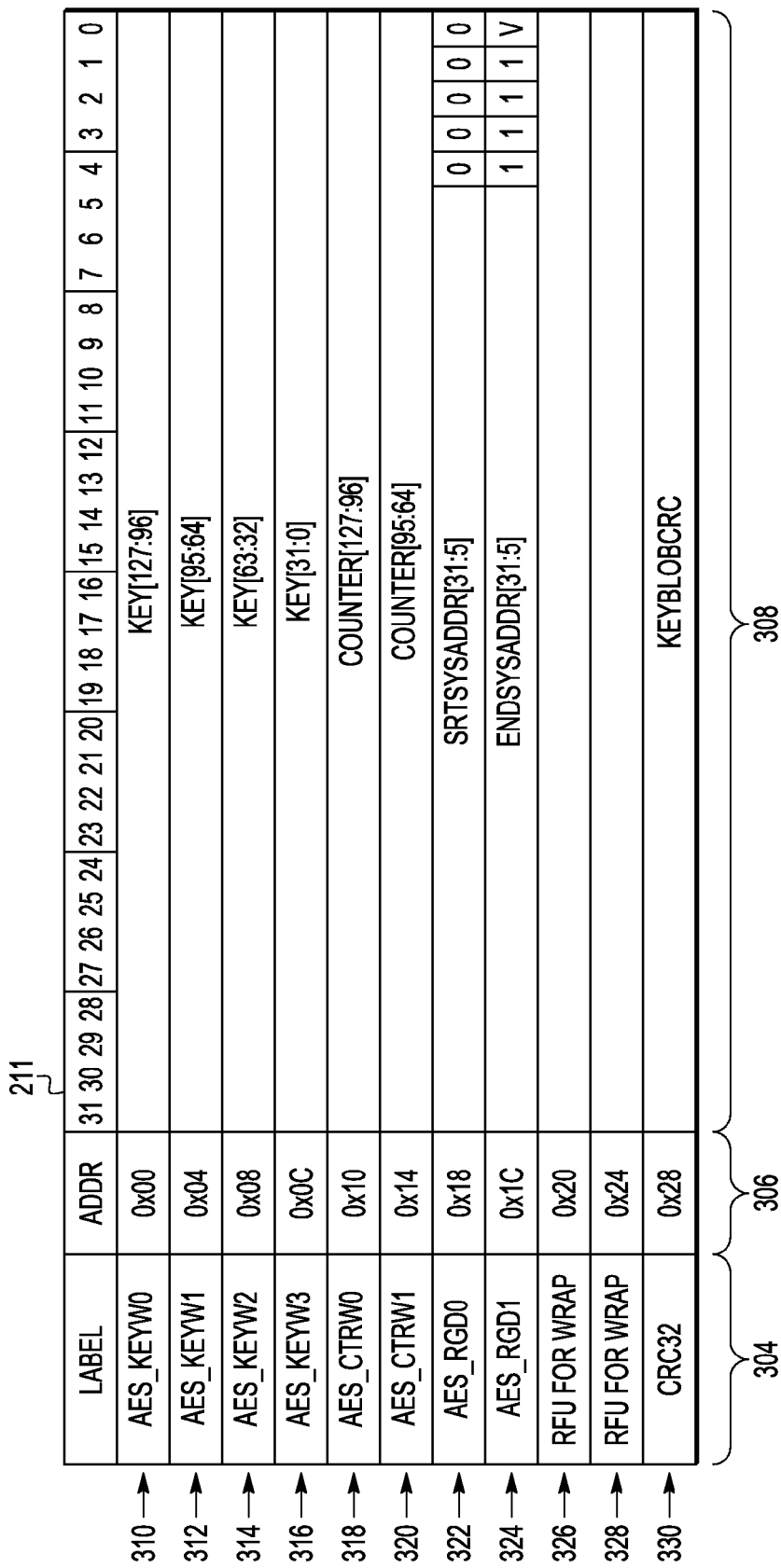
FIG. 4 is a diagram of an example embodiment for contents of a key blob that can be encrypted to form an encrypted key blob.

FIG. 4 is a diagram of an example embodiment for contents of an example key blob 211 that can be encrypted to form an example encrypted key blob. For example, as described herein, a key blob 211A can be encrypted to form an encrypted key blob 134A; a key blob 211B can be encrypted to form an encrypted key blob 134B; a key blob 211C can be encrypted to form an encrypted key blob 134C; and a key blob 211D can be encrypted to form an encrypted key blob 134D. For the example key blob 211 in FIG. 4, column 304 represents a label for the contents of the various rows within the key blob 211; column 306 represents the address offset in hexadecimal for the start of each of the rows within the key blob 211; and column 308 represents the contents for each row of the key blob 211. For the example embodiment depicted, each row is configured as 32 bits of data from bit 31 (most significant bit) to bit 0 (least significant bit), and a 128-bit secret key is being used for encryption of the software image associated with the key blob 211. It is also assumed for this embodiment that multiple software images may be encrypted and combined to form the full encrypted image 132 as shown with respect to FIGS. 2A-B and 3. If only a single software image were being used, for example, the start/end addresses described below could be removed. Other variations could also be implemented.

Looking to the particular rows within the key blob 211, rows 310, 312, 314, and 316 are used to store the 128-bit secret key used as the secret key for the software image associated with the key blob 211. Further, this 128-bit secret key can be an AES key. In particular, row 310 (AES_KeyW0) is used to store bits 96-127 of the AES key (Key[127:96]); row 312 (AES_KeyW1) is used to store bits 64-95 of the AES key (Key[95:64]); row 314 (AES_KeyW2) is used to store bits 32-63 of the AES key (Key[63:32]); and row 316 (AES_KeyW3) is used to store bits 0-31 of the AES key (Key[31:0]). Rows 322 and 324 are used to store address information within the full encrypted information 302 for the software image associated with the key blob 211. In particular, row 322 (AES_RGD0) is used to store the start byte address (SrtSysAddr[31:5]) for the software image, and row 324 (AES_RGD1) is used to store the end byte address (EndSysAddr[31:5]) for the software image. It is noted that the least significant 5 bits (4:0) for each of row 322 and 324 can store mostly fixed values. For example, bits 0 to 4 of row 322 can be set to "0;" bits 1 to 4 for row 324 can be set to "1," and bit 0 of row 324 can hold a valid (V) bit. Row 330 (CRC32) is used to store an error check value for the data within the key blob, such as a 32-bit CRC (cyclic redundancy check) value stored as bits 0-31 (KeyBlobCRC) within row 330.

It is further noted that other information can also be stored in the key blob 211. For example, rows 318 and 320 can be included and be used to store a portion of a counter value that is used within the decryption system 112. In particular, row 318 (AES_CtrW0) is used to store bits 96-127 of the counter value (Counter[127:96]), and row 320 (AES_CrtW1) is used to store bits 64-95 of the counter value (Key[95:64]). Further, additional rows, such as rows 326 and 328, can be reserved for future use (RFU). Other variations could also be implemented.

Figure 5:
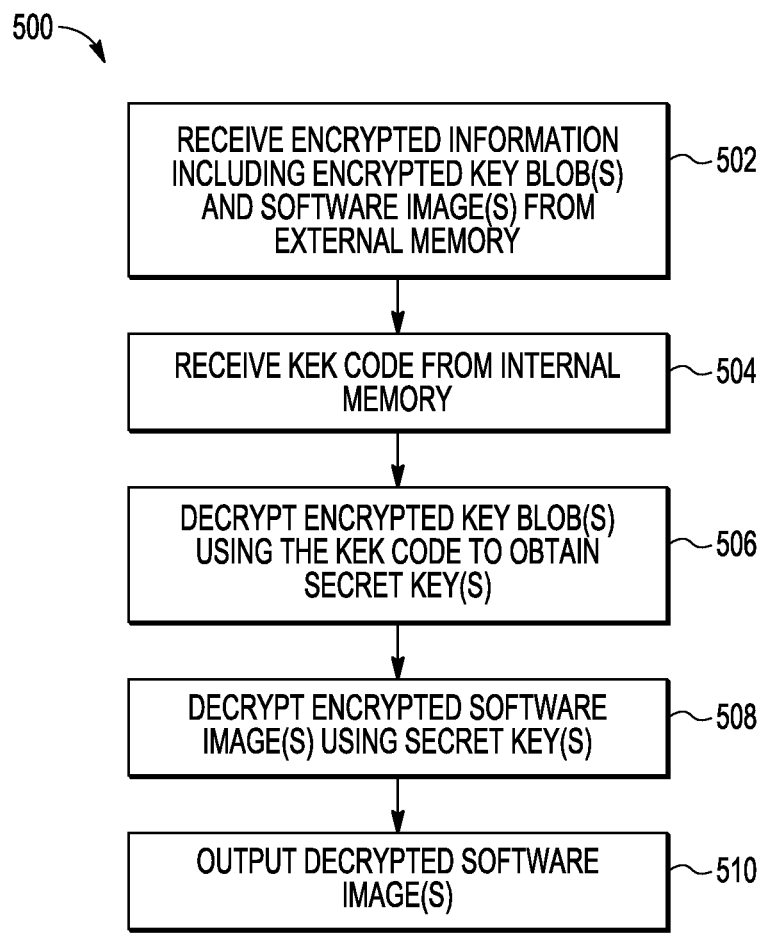
FIG. 5 is a process flow diagram of an example embodiment for managing and using keys for a decryption system within an integrated circuit.

FIG. 5 is a process flow diagram of an example embodiment 500 for managing and using keys for a decryption system within an integrated circuit. In block 502, encrypted information is received from an external memory, and the encrypted information includes one or more encrypted key blob(s) and one or more encrypted software image(s). In block 504, a key-encryption key (KEK) code is received from internal memory within the integrated circuit. In block 506, the KEK code is used to decrypt the one or more encrypted key blob(s) to obtain one or more secret key(s) stored within the one or more key blob(s). In block 508, the secret key(s) are used to decrypt the one or more encrypted software image(s). In block 510, the decrypted software image(s) are output, for example, to other processing circuitry within the integrated circuit. It is noted that additional and/or different process blocks could also be utilized while still taking advantage of the key management embodiments described herein.

As described herein, a variety of embodiments can be implemented and different features and variations can be implemented, as desired.

For one embodiment, a method is disclosed for key management and decryption within an integrated circuit including receiving encrypted information from an external memory that is external to an integrated circuit where the encrypted information includes an encrypted key blob having a secret key for an encrypted software image also stored within the external memory, obtaining a key-encryption key (KEK) code from an internal memory within the integrated circuit, using the KEK code to generate a key-encryption key (KEK) for the key blob, decrypting the encrypted key blob using the KEK to obtain the secret key, and decrypting encrypted code associated with the encrypted software image using the secret key to generate decrypted code, where the obtaining, using, and decrypting are performed within the integrated circuit. In further embodiments, the obtaining, using, and decrypting are performed such that the KEK and the secret key are accessible to decryption hardware within the integrated circuit and inaccessible to any software-accessible mechanism. In still further embodiments, the encrypted code associated with the encrypted software image and the encrypted key blob are encrypted with an AES (Advanced Encryption Standard) encryption algorithm.

In other embodiments, the encrypted information includes a plurality of encrypted key blobs for a plurality of encrypted software images stored within the external memory, and each encrypted key blob is associated with one of the encrypted software images and comprises a secret key for that encrypted software image. In additional embodiments, the KEK code is used to provide a KEK for each encrypted key blob, and the decrypting includes decrypting the plurality of encrypted key blobs to obtain the secret keys and decrypting encrypted code for each encrypted software image using the secret key for that software image. In addition, the internal memory can include a one-time programmable (OTP) memory that is programmed to store the KEK code.

In further embodiments, the method also includes scrambling the KEK code to generate the KEK. In other embodiments, the KEK code matches the KEK, and the method further includes generating the KEK by using the KEK code as the KEK. In additional embodiments, the method includes storing a bypass indicator within the internal memory and using the bypass indicator to determine whether to apply scrambling to the KEK code or to bypass scrambling for the KEK code. In still further embodiments, the method also includes outputting the decrypted code to additional processing circuitry within the integrated circuit.

For another embodiment, a system is disclosed for key management and decryption within an integrated circuit including an input buffer within an integrated circuit configured to receive and to store encrypted information from an external memory where the encrypted information includes an encrypted key blob having a secret key for an encrypted software image also stored within the external memory, an internal memory within the integrated circuit configured to store a key-encryption key (KEK) code, and a decryption system, where the input buffer, the internal memory, and the decryption system are within the integrated circuit. The decryption system is configured to generate a key-encryption key (KEK) from the key-encryption key (KEK) code, to decrypt the encrypted key blob using the KEK to obtain the secret key, and to decrypt encrypted code from the encrypted software image using the secret key to generate decrypted code. In further embodiments, the decryption system is configured to operate such that the KEK, and the secret key are accessible to decryption hardware within the integrated circuit and inaccessible to any software-accessible mechanism. In still further embodiments, the encrypted software code associated with the encrypted software image and the encrypted key blob are encrypted with an AES (Advanced Encryption Standard) encryption algorithm.

In other embodiments, the encrypted information includes a plurality of encrypted key blobs for a plurality of encrypted software images stored within the external memory, and each encrypted key blob is associated with one encrypted software image and comprises a secret key for that encrypted software image. In additional embodiments, the decryption system is further configured to use the KEK code to provide a KEK for each encrypted key blob, to decrypt the plurality of encrypted key blobs to obtain the secret keys, and to decrypt the encrypted code for each encrypted software image using the secret key for that software image. In addition, the internal memory can include a one-time-programmable (OTP) memory.

In further embodiments, the system includes a scrambler configured to receive the KEK code and to scramble the KEK code to obtain the KEK for encrypted key blob. In other embodiments, the KEK code matches the KEK, and the decryption system is further configured to generate the KEK by using the KEK code as the KEK. In additional embodiments, the internal memory is further configured to store a bypass indicator, and a scrambler is configured to use the bypass indicator to determine whether to apply scrambling to the KEK code to generate the KEK for the encrypted key blob or to bypass scrambling for the KEK code to use the KEK code as the KEK for the encrypted key blob. In still further embodiments, the system includes an output buffer configured to store the decrypted code, and the output buffer is available for access by other processing circuitry within the integrated circuit.

It is noted that the functional blocks, devices, and/or circuitry described herein can be implemented using hardware, software, or a combination of hardware and software. In addition, one or more processing devices executing software and/or firmware instructions can be used to implement the disclosed embodiments. It is further understood that one or more of the operations, tasks, functions, or methodologies described herein can be implemented, for example, as software, firmware and/or other program instructions that are embodied in one or more non-transitory tangible computer readable mediums (e.g., data storage devices, flash memory, random access memory, read only memory, programmable memory devices, reprogrammable storage devices, hard drives, floppy disks, DVDs, CD-ROMs, and/or any other tangible storage medium) and that are executed by one or more central processing units (CPUs), controllers, microcontrollers, microprocessors, hardware accelerators, processors, and/or other processing devices to perform the operations and functions described herein.

Unless stated otherwise, terms such as "first" and "second" are used to arbitrarily distinguish between the elements such terms describe. Thus, these terms are not necessarily intended to indicate temporal or other prioritization of such elements.

Further modifications and alternative embodiments of the described systems and methods will be apparent to those skilled in the art in view of this description. It will be recognized, therefore, that the described systems and methods are not limited by these example arrangements. It is to be understood that the forms of the systems and methods herein shown and described are to be taken as example embodiments. Various changes may be made in the implementations. Thus, although the invention is described herein with reference to specific embodiments, various modifications and changes can be made without departing from the scope of the present invention. Accordingly, the specification and figures are to be regarded in an illustrative rather than a restrictive sense, and such modifications are intended to be included within the scope of the present invention. Further, any benefits, advantages, or solutions to problems that are described herein with regard to specific embodiments are not intended to be construed as a critical, required, or essential feature or element of any or all the claims.

What is claimed is:

1. A method for an integrated circuit, comprising:
   receiving encrypted information from an external memory that is external to the integrated circuit, the encrypted information comprising an encrypted key blob having a secret key for an encrypted software image also stored within the external memory;
   communicating with an internal memory within the integrated circuit to obtain a key-encryption key (KEK) code;
   scrambling the KEK code within the integrated circuit to generate a key-encryption key (KEK) for the encrypted key blob;
   decrypting the encrypted key blob within the integrated circuit with the KEK to obtain the secret key;
   decrypting encrypted code associated with the encrypted software image within the integrated circuit with the secret key to generate decrypted code;
   storing the decrypted code within an output buffer within the integrated circuit; and
   outputting the decrypted code to additional processing circuitry within the integrated circuit;
   wherein the receiving, communicating, scrambling, decrypting, storing, and outputting are performed within the integrated circuit.

2. The method of claim 1, wherein the receiving, communicating, scrambling, storing, and decrypting are performed such that the KEK and the secret key are accessible to decryption hardware within the integrated circuit and inaccessible to any software-accessible mechanism.

3. The method of claim 1, wherein the encrypted information comprises a plurality of encrypted key blobs for a plurality of encrypted software images stored within the external memory, and wherein each encrypted key blob is associated with one of the encrypted software images and comprises a secret key for that encrypted software image.

4. The method of claim 3, wherein the KEK code is scrambled to provide a KEK for each encrypted key blob, and wherein the decrypting comprises decrypting the plurality of encrypted key blobs to obtain the secret keys and decrypting encrypted code for each encrypted software image using the secret key for that software image.

5. The method of claim 1, wherein the internal memory comprises a one-time programmable (OTP) memory that is programmed to store the KEK code.

6. The method of claim 1, further comprising storing a bypass indicator within the internal memory, and further comprising using the bypass indicator to determine whether to apply scrambling to the KEK code or to bypass scrambling for the KEK code.

7. The method of claim 1, wherein the encrypted code associated with the encrypted software image and the encrypted key blob are encrypted with an AES (Advanced Encryption Standard) encryption algorithm.

8. A system for an integrated circuit, comprising:
   an input buffer within the integrated circuit configured to receive and to store encrypted information from an external memory, the encrypted information comprising an encrypted key blob having a secret key for an encrypted software image also stored within the external memory;
   an internal memory within the integrated circuit configured to store a key-encryption key (KEK) code;
   a decryption system configured to generate a key-encryption key (KEK) from the key-encryption key (KEK) code, to decrypt the encrypted key blob using the KEK to obtain the secret key, to decrypt encrypted code from the encrypted software image using the secret key to generate decrypted code, and to output the decrypted code to additional processing circuitry within the integrated circuit; and
   a scrambler within the decryption system configured to receive the KEK code and to scramble the KEK code to generate the KEK for encrypted key blob;
   wherein the input buffer, the internal memory, and the decryption system including the scrambler are within the integrated circuit.

9. The system of claim 8, wherein the decryption system is configured to operate such that the KEK and the secret key are accessible to decryption hardware within the integrated circuit and inaccessible to any software-accessible mechanism.

10. The system of claim 8, wherein the encrypted information comprises a plurality of encrypted key blobs for a plurality of encrypted software images stored within the external memory, and wherein each encrypted key blob is associated with one encrypted software image and comprises a secret key for that encrypted software image.

11. The system of claim 10, wherein the decryption system is further configured to scramble the KEK code to provide a KEK for each encrypted key blob, to decrypt the plurality of encrypted key blobs to obtain the secret keys, and to decrypt the encrypted code for each encrypted software image using the secret key for that software image.

12. The system of claim 8, wherein the internal memory comprises a one-time-programmable (OTP) memory.

13. The system of claim 8, wherein the internal memory is further configured to store a bypass indicator, and wherein a scrambler is configured to use the bypass indicator to determine whether to apply scrambling to the KEK code to generate the KEK for the encrypted key blob or to bypass scrambling for the KEK code to use the KEK code as the KEK for the encrypted key blob.

14. The system of claim 8, wherein the encrypted software code associated with the encrypted software image and the encrypted key blob are encrypted with an AES (Advanced Encryption Standard) encryption algorithm.

15. The system of claim 8, further comprising an output buffer within the decryption system configured to store the decrypted code for output to the additional processing circuitry within the integrated circuit.

* * * * *